United States Patent [19]
Lien et al.

[11] Patent Number: 5,623,354
[45] Date of Patent: Apr. 22, 1997

[54] LIQUID CRYSTAL DISPLAY WITH MULTI-DOMAINS

[75] Inventors: Shui-Chih A. Lien, Briarcliff Manor; Richard A. John, Yorktown Heights; Marie Angelopoulos, Briarcliff Manor, all of N.Y.

[73] Assignee: International Business Machines Corporation, Armonk, N.Y.

[21] Appl. No.: 194,239

[22] Filed: Feb. 10, 1994

[51] Int. Cl.$^6$ .................. G02F 1/1337; G02F 1/1333
[52] U.S. Cl. .................. 349/124; 349/132; 349/138
[58] Field of Search .................. 359/76, 78, 79

[56] References Cited

U.S. PATENT DOCUMENTS

| | | | |
|---|---|---|---|
| 4,812,018 | 3/1989 | Kobayash | 359/79 |
| 4,965,242 | 10/1990 | DeBoer et al. | |
| 5,013,139 | 5/1991 | Kaganowicz et al. | |
| 5,040,876 | 8/1991 | Patel et al. | |
| 5,045,418 | 9/1991 | Fukuyoshi | |
| 5,073,294 | 12/1991 | Shannon et al. | |
| 5,101,288 | 3/1992 | Ohta et al. | |
| 5,130,703 | 7/1992 | Fairbanks et al. | 359/76 |
| 5,151,804 | 9/1992 | Verhulst et al. | |
| 5,223,963 | 6/1993 | Okada et al. | 359/76 |
| 5,249,070 | 9/1993 | Takano | |
| 5,280,375 | 1/1994 | Tsuda et al. | 359/79 |
| 5,285,298 | 2/1994 | Keneko et al. | 359/45 |
| 5,309,264 | 5/1994 | Lien et al. | |
| 5,345,250 | 9/1994 | Inoue et al. | 345/98 |

FOREIGN PATENT DOCUMENTS

| | | |
|---|---|---|
| 0549283 | 6/1993 | European Pat. Off. |
| 63-106624 | 11/1988 | Japan |
| 62-22366 | 8/1994 | Japan |
| 6-281937 | 10/1994 | Japan |

OTHER PUBLICATIONS

Y. Koike, T. Kamada, K. Okamoto, M. Ohashi, I. Tomita, M. Okabe, "Late-News Paper: A Full-Color TFT-LCD with a Domain-Divided Twisted-Nematic Structure", Fujitsu Ltd., Atsugi, Japan, SID 92 Digest, pp. 798-801 (1992).

*Primary Examiner*—Wael Fahmy
*Assistant Examiner*—Fetsum Abraham
*Attorney, Agent, or Firm*—David Aker; Jay P. Sbrollini

[57] ABSTRACT

A liquid crystal display with an array of pixels comprises a liquid crystal layer having transparent electrodes on either side thereof with an alignment layer disposed on each of the electrodes and in contact with opposite surfaces of the liquid crystal layer. The alignment layers are capable of inducing a predetermined pre-tilt angle on the molecules of the liquid crystal. The pre-tilt angle inducing ability of at least one of the alignment layers, which is formed with only one alignment direction, has been selectively altered so that pre-tilt angle inducing ability in the altered area differs in the magnitude of the angle from the pre-tilt angle inducing ability of the unaltered area. With the liquid crystal molecules having at least two different pre-tilt angles, more than one domain is created when voltage is applied across the electrodes. The change in the pre-tilt angle inducing ability in the altered areas is achieved by exposure to a beam, such as ultra violet light, of sufficient energy. In the preferred embodiment, the display is an active type with twisted nematic liquid crystals.

30 Claims, 9 Drawing Sheets

– – – –
LIQUID CRYSTAL DISPLAY WITH MULTI-DOMAINS

BACKGROUND OF THE INVENTION

1. Field of the Invention

This invention relates to a liquid crystal display (LCD) panel and, more particularly, to a display panel having more than one domain in the panel.

2. Description of the Background Art

It is known that liquid crystal displays with a single domain in each cell or pixel have unsymmetrical viewing angles behavior, especially in the vertical viewing-axis for single-domain LCD's orientated in the conventional manner.

Figure 1:
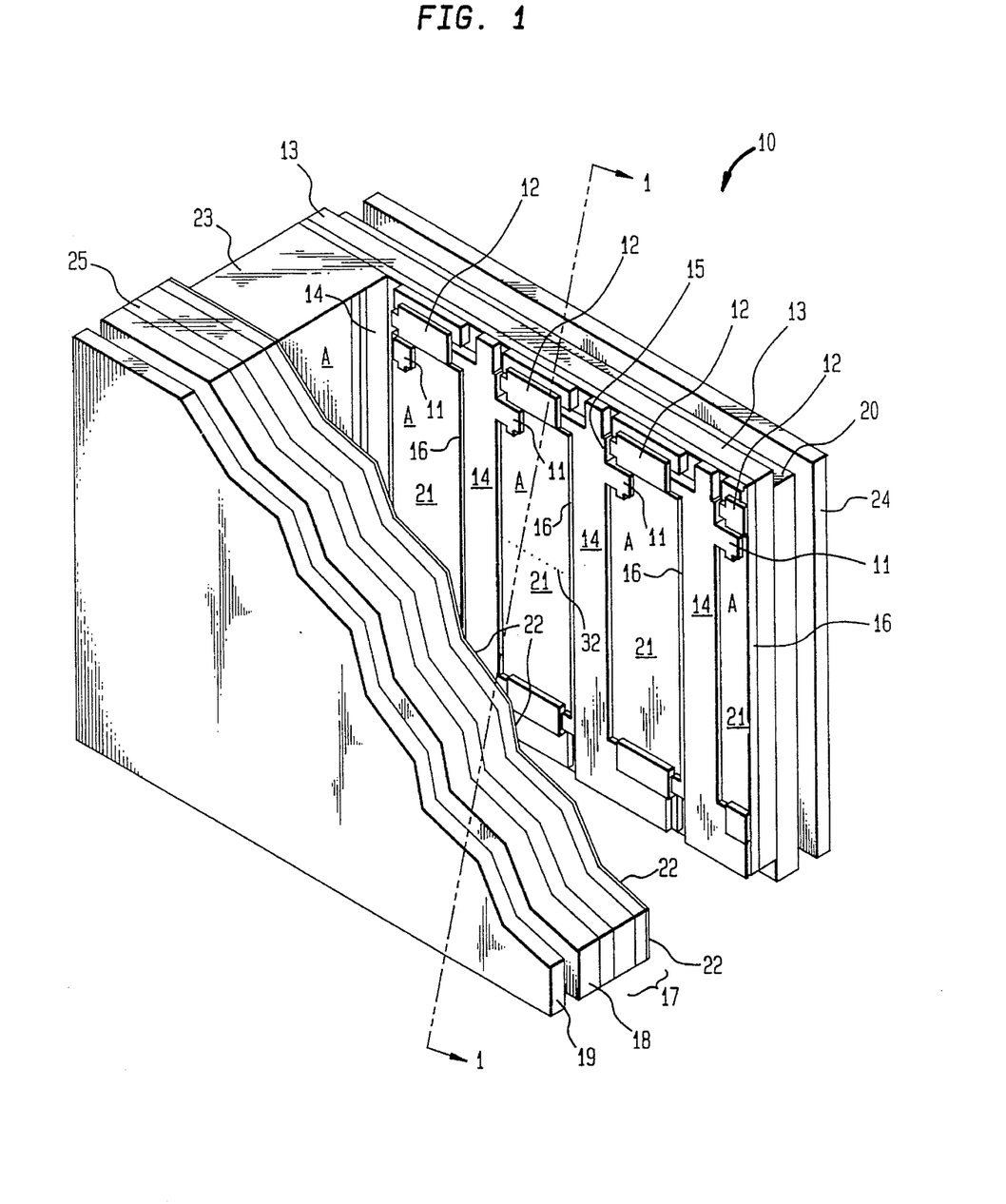
FIG. 1 is an enlarged partial perspective view of a TFT liquid crystal display which will be enhanced by the present invention.

In the current fabrication of single-domain liquid crystal displays, each surface of the panel's transparent electrodes in contact with the liquid crystal (LC) layer is formed with an alignment film. These two films or layers usually are rubbed so as to form the alignment direction as illustrated by the direction of the molecules 28 in FIG. 2. The alignment layers cause the alignment of the longitudinal axes of the liquid crystal molecules and a tilting of the molecules at a small angle, known as the pre-tilt angle, relative to the plane of the alignment layer. The pre-tilt angle of the LC molecules adjacent the alignment films are such that the bulk liquid crystal molecules are caused to take a common orientation with the molecules adjacent the alignment layers so that each pixel or cell will exhibit a single domain when voltage is applied. Depending on the rubbing directions of the alignment films in the fabrication of the panel and with the display in the conventional orientation as shown in FIG. 1, either the top or bottom viewing zone will have a large reverse contrast whereas the opposite vertical zone (bottom or top) will have poor contrast between ray scale levels.

It has been found that, with the display in the conventional orientation, the vertical viewing angle behavior of the liquid crystal display is improved when the display cells or pixels are each fabricated such that two domains are formed when voltage is applied across the liquid crystal layer. Four methods have been proposed for fabricating such two domain pixels; namely, 1) multiple rubbing as disclosed in JP 63-106624; 2) multiple alignment layer as reported in SID 92 Digest p 798; 3) edge field fringe as described in U.S. Pat. No. 5,249,070; and 4) parallel fringe field as disclosed in U.S. patent application Ser. No. 07/879,256, filed Apr. 30, 1992, and assigned to the same assignee. In method 1), the alignment layers in a pixel are each divided by a boundary and the area on one side of the boundary is rubbed in one direction and the area on the other side is rubbed in the opposite direction to form an alignment layer with two areas each with a different alignment direction. When one area is being rubbed, the other area must be protected thereby complicating the fabrication process. Method 2) also is complicated since it requires, at each surface of the liquid crystal, two different alignment materials which will cause different pre-tilt angles. An inorganic alignment material is first deposited on each of the transparent electrodes followed by the deposition of an organic alignment material on the inorganic layer. A photoresist is coated on the organic layer and patterned and developed so that half of each of the inorganic/organic layers of each pixel are still covered by the photoresist after development. The organic alignment layer in the half where the photoresist has been removed is etched away to leave that half of the pixel with the inorganic alignment layer and the other half with the organic layer after the photoresist is removed. Finally, each of the inorganic/organic layers are rubbed in the appropriate direction to complete the fabrication of the alignment layers, each with two areas, one with one alignment material and the other with a different alignment material. In method 3), only a single domain is present when voltage is not applied, but the fringe fields at opposite edges of the pixel cause the liquid crystal molecules to tilt toward the field at their closest edge when voltage is applied to produce two domains in the pixel. In method 4), a slot is formed or etched in the common electrode in the center of each pixel so that, when voltage is applied, two pairs of parallel fringe fields are produced, one field of a pair by the pixel edge and the other field of this pair by the edge of the slot. These two parallel fringe fields with voltage applied will cause LC molecules on each side of the slot in the pixel to tilt in the direction of the edge fringe field on the respective side of the slot, thereby forming two domains.

Three of these methods increase the complexity of fabricating a two-domain display panel as compared to a panel with only a single domain per cell. The multiple rubbing method 1) requires protecting part of the alignment layer with photoresist and multiple rubbing of the alignment layer. Similarly, the multiple alignment layer of method 2) and the parallel fringe field of method 4) demands patterning with photoresist and removal of part of the organic layer in method 2) or part of the electrode layer in method 4). Since these three methods necessitate coating, baking, patterning, developing and stripping a photoresist, the fabrication of the display panel by any one of these methods is more complicated and thus increases the manufacturing cost above the cost of a single-domain display panel. Method 3) does not form two areas in each pixel to form a two-domain pixel but, by utilizing the edge fringe fields, creates a two-domain pixel when voltage is applied. However, with this method, the boundary between the two domains is not well defined.

SUMMARY OF THE INVENTION

Accordingly, the primary object of the present invention is to noticeably enhance all of the viewing angle behavior of a liquid crystal display.

An additional object of the present invention is to sufficiently improve the viewing angle behavior of the liquid crystal display so that quality viewing is possible, when viewing the display panel, such as a computer monitor or a large television screen, at a significant distance from the panel and at angles other than normal to face of the panel.

A further object of the present invention is to improve all of the viewing angle behavior of a liquid crystal display while maintaining the fabrication method of the panel basically the same as a panel with single-domain cells or pixels and maintaining essentially equivalent manufacturing cost.

Another object of the present invention is to provide a two or more domain LC display panel with a well defined boundary between the domains and whose gray level transmission symmetry in the vertical-axis, when the panel is in its conventional orientation, is vastly superior to that of single-domain panels.

These and other objects are achieved by a liquid crystal display having, on either side of the liquid crystal layer which is composed of liquid crystal molecules, at least one of the alignment layers, with a surface whose ability to induce a pre-tilt angle on the molecules adjacent thereto is the same prior to being altered and is formed with only one alignment direction, being selectively altered or modified so that the alignment layer comprises at least one altered or modified area whose ability to induce a pre-tilt angle on the liquid crystal molecules differs in the magnitude of the angle from the pre-tilt angle of the unaltered or unmodified area, thereby creating at least two domains when voltage is applied across the liquid crystal layer. Preferably, the difference in magnitude of the pre-tilt angle is about 3 degrees but a difference of about 1.5 degrees is sufficient to practice the present invention.

The alteration or modification preferably is accomplished by exposing at least one of the alignment layers to an energy beam, such as electromagnetic radiation, of an energy dosage sufficient to cause said alteration or modification in the exposed area. The alignment material should preferably itself exhibit some degree of sensitivity to the energy beam, such as electromagnetic radiation, but if it is not sufficiently sensitive to the electromagnetic radiation to be altered or modified upon exposure, an initiator and/or sensitizer, as is well known in the art, may be incorporated into the alignment material as long as it does not materially decrease the charge retention property or the alignment quality of the alignment material. Since the alignment layer normally is a polymer, such as polyimide, polyamide, polyvinyl acetate, polyvinyl alcohol and copolymers and/or blends thereof, the preferred electromagnetic radiation is ultra violet (UV) light, and wavelengths of UV ranging from 200 to 436 nm at dosages of 50 to 500 mj/cm$^2$ have been found to be the most effective for such polymers. Other energy beam sources which can be used in place of UV light are ion beam, x-ray, molecular beam, particle beam, electron beam, and laser beams of different wavelengths. It will be recognized by those skilled in the art that some of these energy beams, such as direct write electron beam, do not require a mask to selectively expose part of an alignment layer of a pixel. However, other energy beams, such as the preferred UV exposure, usually necessitate a mask, and the alignment layer can be exposed with the patterned side of the mask in contact with the alignment layer, or the energy beam can be projected through the mask at a distance from the alignment layer.

Unlike the methods for fabricating LCD panels with two-domain cells as described in the Background Art, the method of making the LCD panel of the present invention permits the use of an alignment material, whose ability to induce a pre-tilt angle is the same before it is altered and which is formed with only one alignment direction, and only requires the additional step of selectively altering one of the alignment layers, such as by exposure to an energy beam, preferably UV light through a mask, if needed, having the desired pattern. Depending upon the wavelength sensitivity of the alignment material, the UV exposure apparatus could be the same apparatus as used in fabricating other aspects of the LC display panel, such as the thin film transistor or diode for active displays. Herein, the mask comprises a quartz plate with a chrome layer having the pattern etched therein, as is commonly used in the manufacture of semiconductors, such that at least one area in at least one alignment layer of each cell or pixel is exposed to the UV light. Although a contact mask exposure will be described in the embodiments, it will be understood that projection exposure is intended to be within the scope of the invention.

In one preferred embodiment, each cell or pixel contains two equal areas in each of the alignment layers of the same material, one exposed and one unexposed to the UV light. Herein, the alignment material is a photosensitive polymer. The areas can vertically, horizontally or diagonally divide the cell or pixel in half. With the two alignment layers in face-to-face relationship in the LC panel, the exposed areas of one alignment layer are positioned across from the unexposed areas of the other alignment layer. If it is desired to have the optimum viewing angles originate at other than the center point of the panel, then the areas will be unequal in size.

In another preferred embodiment, only one of the alignment layers is exposed to UV light and the other alignment layer is of a different material and induces a different pre-tilt angle on the liquid crystal molecules than the pre-tilt angles of the exposed/unexposed alignment layer. The advantage of this second embodiment is that it eliminates the necessity of the positioning the boundary between the areas of one alignment layers in face-to face relationship as is required in the other preferred embodiment. Both of these embodiments of the present invention provide superior vertical viewing behavior over current single-domain liquid crystal displays.

DETAILED DESCRIPTION OF THE PREFERRED EMBODIMENTS

Although the present invention also is suitable for use in passive liquid crystal displays, it will be described in embodiments of an active display and specifically a thin film transistor (TFT) liquid crystal display. As partially shown in FIG. 1, a conventional TFT display 10 comprises an array of cells or pixels A, each cell including a thin film transistor 11 to address the cell by applying a voltage to the cell when the transistor is in its on state and a capacitor 12 which maintains the voltage after the transistor is switched off. The transistor is formed on a glass substrate 13 on the back side of the display 10 and is connected between a column or data electrode 14 and a row electrode 15 and to a display transparent electrode 16 of each pixel, all at the back side of the display 10. The front side of the display 10 is formed with a continuous common transparent electrode 17 which is spaced apart from and positioned parallel to the transparent display electrode. Both the common electrode 17 and the display electrode 16 are preferably formed of a thin transparent conductive material, such as indium tin oxide (ITO), carried on a glass substrate. Since the display electrode of each pixel is smaller in dimensions than the continuous common electrode, a fringe field results which spreads outward from the pixel or cell edges of the display electrode to the common electrode when voltage is applied across the electrodes. Parallel with the outside of the common electrode 17 and adjacent glass substrate 18 is a polarizer 19, which is appropriately orientated relative the a polarizer 20 mounted in back of the rear glass substrate 13. Alignment layers 21 and 22 are disposed on the inner surface of the display and common electrodes 16 and 17, respectively, and are in contact with a liquid crystal layer 23, herein twisted nematic liquid crystal molecules with a positive dielectric anisotrophy, which is sealed between the two parallel mounted glass substrates carrying the alignment layers 21 and 22. On the back side of the display 10 is a visible light source (not shown) which irradiates the display 10 through a diffuser 24. If it is desired to have the display 10 in color, a color filter 25 is disposed adjacent the non-alignment layer side of the common electrode 17, and contains groups of the three primary colors (red, green, and blue), each one of the primary colors being associated with one of a group of three adjacent pixels A to form a color cell.

Figure 2:
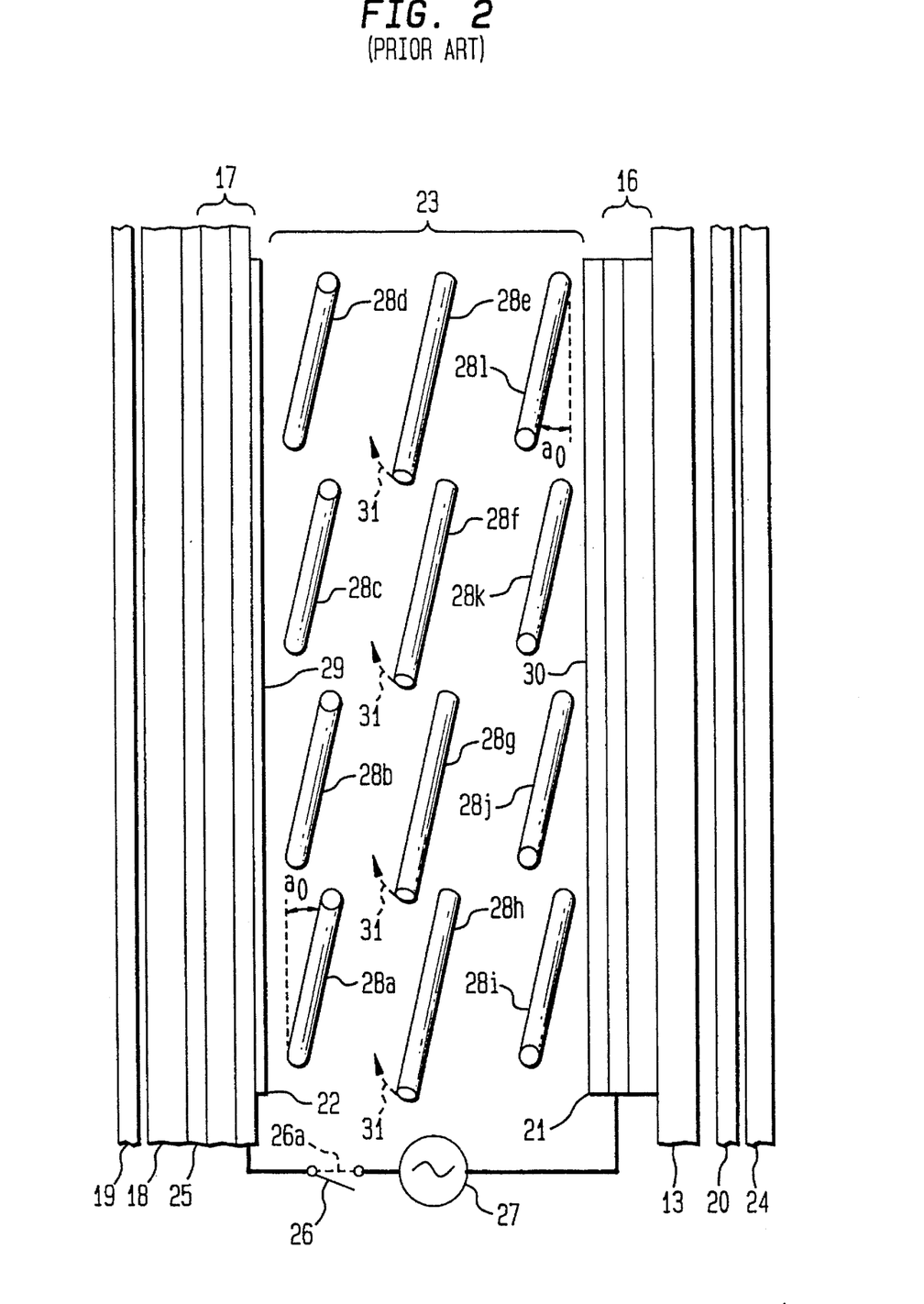
FIG. 2 is a cross-sectional view, taken along line 1—1 of FIG. 1 to partially show diagrammatically a single-domain cell or pixel of the display.

To illustrate the environment of the present invention in more detail, FIG. 2 shows an enlarged cross-section of the layers of a single domain cell or pixel (prior art) of the liquid crystal display taken along line 1—1 of FIG. 1. with switch 26 (representing the TFT in each pixel) open and a voltage is not applied across the liquid crystal layer 23. In this illustration, the liquid crystal layer comprises twisted nematic liquid crystals with a left-handed twist which is conventionally achieved by using chiral additives. FIG. 2 diagrammatically shows this LC layer 23 as elongated molecules 28a, 28b, 28c, 28d, 28e, 28f, 28g, 28h, 28i, 28j, 28k, and 28l with molecules 28a, 28b, 28c, and 28d being in contact with surface 29 of the front alignment layer 22 and molecules 28i, 28j, 28k, and 28l being in contact with surface 30 of the rear or back alignment layer 21. Molecules 28a–d and molecules 28i–l are tilted longitudinally away from their respective surfaces 29, 30 by the same angle $a_0$. Because of the twist angle of the LC molecules, the molecules along the surfaces 29 and 30 are drawn going into and out of the plane of the paper. The bulk molecules, as depicted by 28e–28h, are drawn longer since they are oriented more parallel to the plane of the paper. Surface 29 of the front alignment layer 22 is disposed adjacent the transparent electrode 17, the color filter 25, which is optional, the glass substrate 18, and the polarizer 19 in that order. Surface 30 of the rear alignment layer 21 is disposed adjacent the transparent electrode 16, and the glass substrate 13, the polarizer 20, and the diffuser 24 in that order. The light on the back side of the diffuser 24 for irradiating the liquid crystal display panel is not shown. When switch 26 is closed as shown by the dashed line 26a and voltage is applied, the molecules 28a–d and 28i–l on alignment surfaces 29 and 30 which are influenced by the same pre-tilt angle $a_0$ cause the bulk molecules, as shown by the center molecules 28e–h, to move in the direction as shown by the dashed arrows 31 so that only a single domain exist in each pixel of the LC display thereby limiting its viewing angle behavior.

Figure 3:
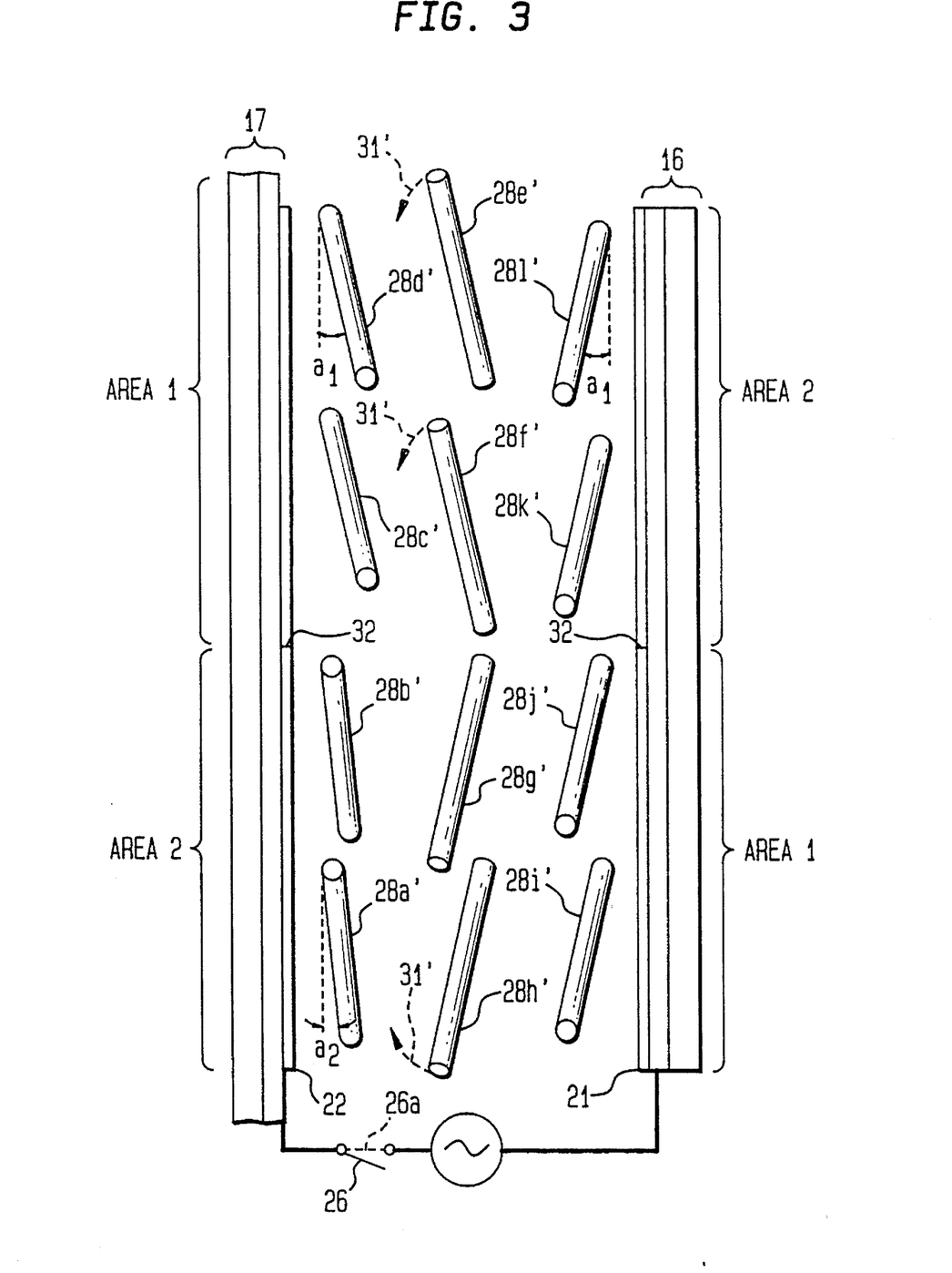
FIG. 3 is a partial cross-sectional view taken along line 1—1 of FIG. 1 diagrammatically showing one embodiment of the present invention.
Figure 7A:
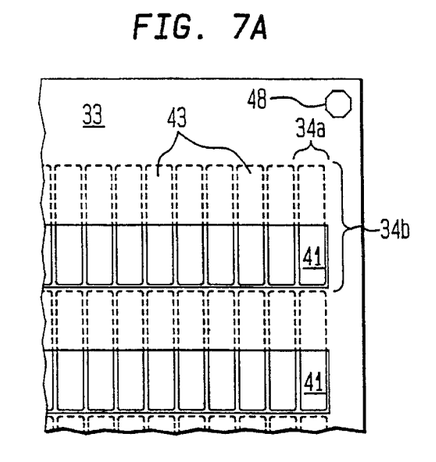
FIGS. 7(a) and (a'), 7(b) and (b') and 7(c) and (c') are plan views of masks with different patterns used in the present invention.
Figure 8A:
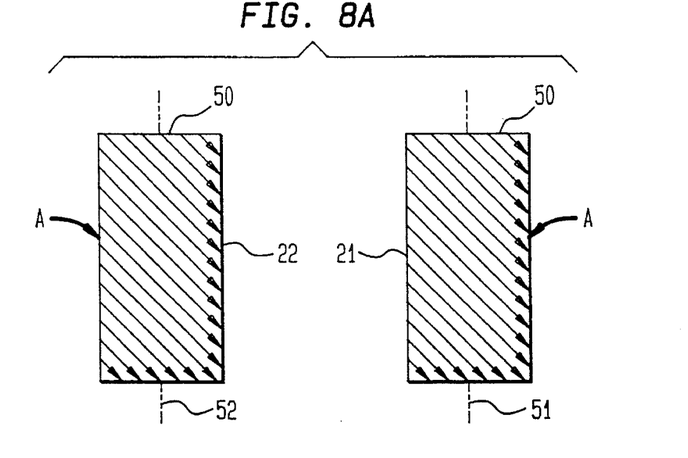
FIGS. 8(a), (b) and (c) are schematic plan views showing the alignment directions necessary for different liquid crystal modes used in the present invention.

To overcome this restricted viewing angle behavior, a first embodiment of the present invention is shown diagrammatically in FIG. 3 with only the liquid crystal molecules, the front 22 and rear 21 alignment layers and the front 17 and rear 16 electrodes being displayed. In the embodiment, the composition of both alignment layers 21, 22, which preferably is a photosensitive polymer, is the same material and is classified as a D-type which will be explained later. Herein, the D-type polymer is a photosensitive polyimide and specifically is RN-1006 which is manufactured by Nissan Chemical Industries, Ltd. It is coated on the transparent electrodes, preferably ITO on glass, and baked as is well known to those skilled in the art. Herein, a mask with UV transmission openings is used to expose a portion of each the display cells or pixels. In the present instant, two masks are used, each being a quartz plate with a patterned chrome layer consisting of UV transparent elongated slots, with each slot having a lateral dimension size which is slightly more than one half of the longest dimension of the cell or pixel as shown in FIGS. 7(a) and 7(a'). The chrome masks are the same type as used in semiconductor manufacturing and are available from a number of commercial mask making companies, most of whom use direct write electron beam exposure to form the pattern in the chrome layer. The liquid crystal is a twisted nematic type with a left-handed twist and specifically is ZLI-5080 with 0.1% to 0.3% of ZLI-811, both manufactured by E. Merck Darmstadt of Germany. The chrome side of the masks of FIG. 7(a) and FIG. 7(a') are brought into contact with the D-type polyimide RN-1006 of alignment layers 22 and 21, respectively, and the layers are exposed to ultra violet light through the mask so that each cell or pixel has an unexposed area, Area I, and an exposed area, Area II as shown in FIG. 3. Herein, the exposure is at a wavelength of 260 nm and a dosage of 250 mj/cm$^2$ by using an Ultra Violet Illumination System, Model 87371 with a 500 watt deep UV lamp, manufactured by Oriel Corporation. The type of UV exposure apparatus is not critical and any of a number of commercially available ones may be used, especially those presently used in semiconductor manufacturing. After the exposure of the alignment layers to UV light, the two alignment layers 21, 22 are aligned by some suitable method as known by those skilled in the art, such as rubbing, in the direction as shown in FIG. 8(a) for the mode of liquid crystal being used. When the alignment layers are positioned face-to-face in the LC display, the alignment direction of the two alignment layers 21, 22 will be 90° apart. As shown in FIG. 3, in the mounted face-to-face position, the alignment layers 21, 22 of the cell or pixel is divided in half as indicated by the boundary line 32 (FIGS. 1 and 3), and Area I of the cell of the alignment layer 22 on the front glass electrode is across from the Area II of the cell of the alignment layer 21 on the back glass electrode. Of course then, Area II of the alignment layer 22 is across from Area I of the alignment layer 21. Since a D-type material was used in this embodiment, the pre-tilt angle $a_2$ of the exposed Area II is smaller than the pre-tilt angle $a_1$ of Area I. For these conditions of exposure, the pre-tilt angle $a_2$ in exposed area II is about 1 degree whereas the pre-tilt angle $a_1$ in Area I is about 4 degrees. FIG. 3 illustrates the present invention with the switch 26 open and without the voltage applied. In this no voltage state, molecules 28c', 28d', 28i', and 28j' in Area I all have a pre-tilt angle $a_1$ greater than the pre-tilt angle $a_2$ of the molecules 28a', 28b', 28k', and 28l' in Area II. When the switch 26 is closed, as shown by dashed line 26'a, and voltage is applied, molecules 28c', 28d', 28i', and 28j' of Area I dominate the direction of movement of bulk molecules 28e', 28f', 28g' and 28h' as shown by the dashed arrows 31'. However, unlike the prior art single domain cell where all of the molecules are orientated in a common direction across the cell with the voltage applied, the molecules in each half of the cell or pixel of the present invention as shown in FIG. 3, are in a common orientation within each half of the cell in the direction of the fringe field at the edge of each of their respective halves, thereby creating the cells or pixels of the present invention with two domains. Thus, with only an additional exposure step which relies on the photomask technology of semiconductor manufacturing, a two-domain LC display is fabricated with essentially no more difficulty than a single domain LC display. Also, the boundary between Area I and Area II is well defined and fixed so that the two domains will have a sharp edge boundary between them.

Although the sequence of the exposure step and the alignment step, herein by rubbing, is preferred, the sequence of these steps can be reversed. Also, the alignment method is not limited to rubbing and other known alignment methods as known by those skilled in the art should be suitable, such as ion etch, Languir Brodgett film, and the like. Further, if desired, the exposed alignment layer can be treated with a development or etching solution which will cause a greater change in the pre-tilt angle in the exposed area and a slight change in the pre-tilt angle in the unexposed area, thereby still providing a substantial pre-tilt angle differential between the exposed and unexposed areas.

Figure 4:
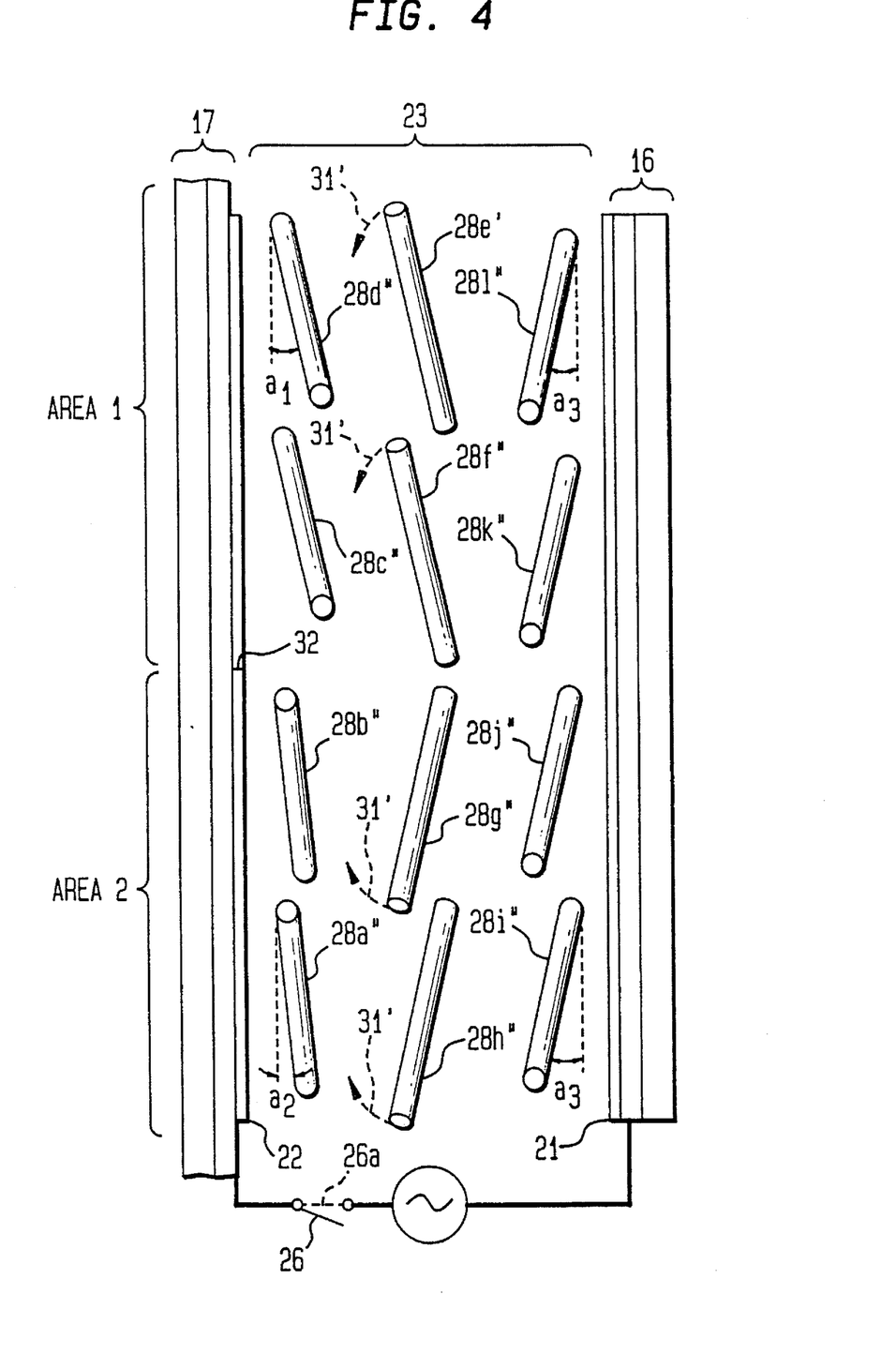
FIG. 4 is a partial cross-sectional view, taken along line 1—1 of FIG. 1 diagrammatically showing another embodiment of the present invention.
Figure 5:
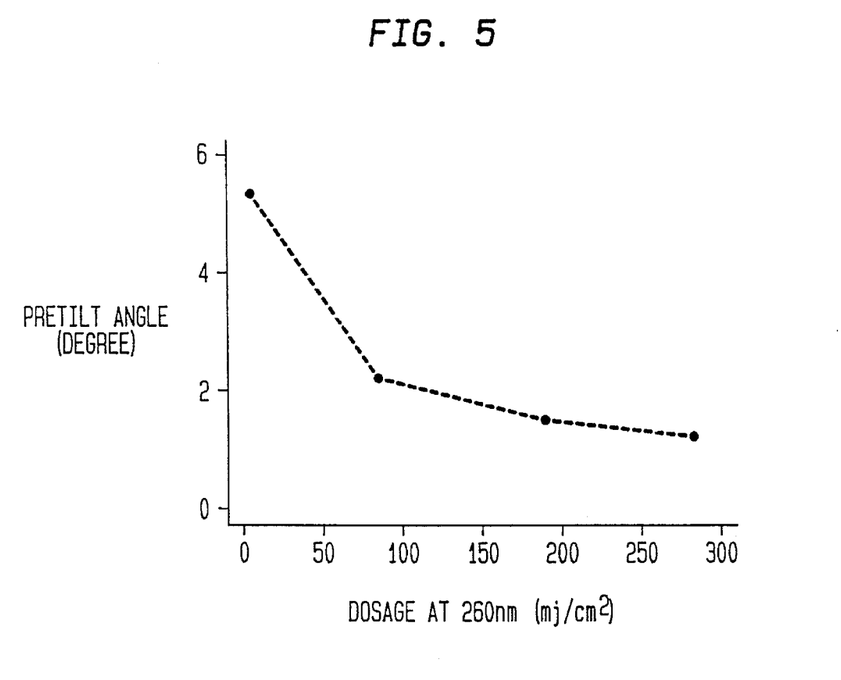
FIG. 5 is a graph of the experimental data resulting from the UV exposure of a D-type alignment material.

A second embodiment of the invention as shown in FIG. 4 comprises a liquid crystal display panel with the alignment layers 22 and 21 on the front and back transparent electrodes 17 and 16, respectively, being of different materials so that they induce different magnitudes of pre-tilt angles in the liquid crystal molecules. In this embodiment, the alignment layer 22 on the front electrode 17 is a photosensitive polyimide material, specifically SE-7210 which is manufactured by Nissan Chemical Industries, Ltd. and whose pre-tilt inducing properties are shown in FIG. 5. The chrome pattern side of the chrome mask shown in FIG. 7(a) is brought into contact with layer 22 and is exposed to UV light with the same apparatus of FIG. 3. Following the exposure, both layer 21 and 22 are aligned as shown in FIG. 8(a) so that the alignment direction of the two layers, when mounted face-to-face in the display panel, will be 90° apart. Since the material of the alignment layer 21, on the back electrode 16 does not have to be exposed or modified, it is not required to be photosensitive. Herein however, it is a photosensitive polyimide and specifically is RN-713 also manufactured by Nissan Chemical Industries, Ltd., which unexposed induces a pre-tilt angle $a_3$ in the liquid crystal molecules less than the pre-tilt angle $a_1$ induced by the unexposed polyimide of Area I but greater than pre-tilt angle $a_2$ of the exposed polyimide of Area II. The alignment layer 21 in this embodiment is not exposed to UV light but is aligned as described above relative to layer 22. As in FIG. 3, the liquid crystal material is ZLI 5080 with 0.1% to 0.3% of ZLI-811, both manufactured by E. Merck Darmstadt of Germany, which is a twisted nematic LC of the left-handed type. However, the alignment layer on the back electrode can be the same material as that on the front electrode if it is uniformly treated or uniformly exposed to an energy beam, such as UV light, so that its pre-tilt capability is less than the pre-tilt capability of the unexposed areas but greater than the pre-tilt capability of the exposed areas in the alignment layer on the common electrode. FIG. 4 illustrates this embodiment with the switch 26 open and without the voltage applied. In this no voltage state, molecules 28c' and 28d' in Area I have pre-tilt angle $a_1$ not only greater than the pre-tilt angle $a_2$ of the molecules 28a' and 28b' in Area II but also greater than the pre-tilt angle $a_3$ of molecules 28i", 28j", 28k" and 28l" adjacent of alignment layer 21. Herein, the pre-tilt angle $a_1$ is about 4°, the pre-tilt angle $a_2$ is about 1°, and the pre-tilt angle $a_3$ is about 2.5°. When the switch 26 is closed as shown by the dashed line 26a, molecules 28c' and 28d' in Area I dominate the direction, as shown by the arrows 31', of the movement of bulk molecules 28e' and 28f'. In area II, molecules 28i" and 28j" dominate the direction of the movement of bulk molecules 28g" and 28h" is shown by arrows 31". Again, unlike the single domain cell where all of the molecules are orientated in a common direction across the cell with the voltage applied, the molecules in each half of the cell or pixel of the embodiment illustrated in FIG. 4, are in a common orientation within each half of the cell in the direction of the fringe field at the edge of their respective halves, thereby creating the cells or pixels of the present invention with two domains.

It will be recognized by those skilled in the art that, since the present invention can be practiced with one of the alignment layers being exposed, greater flexibility exists in selecting the method to be used to form the alignment direction in this unexposed layer. It will be further recognized by those skilled in the art that each cell or pixel does not have to be formed with exposed and unexposed areas, but instead, for example, two pixels could constitute a pixel element in which one pixel is exposed and the adjacent pixel is not so that, when voltage is applied, each pixel is a single domain but the pixel element is a two domain element because the single domains are orientated in different directions. In contrast, the pixels of the current single domain LC displays are all oriented in the same direction.

Figure 6:
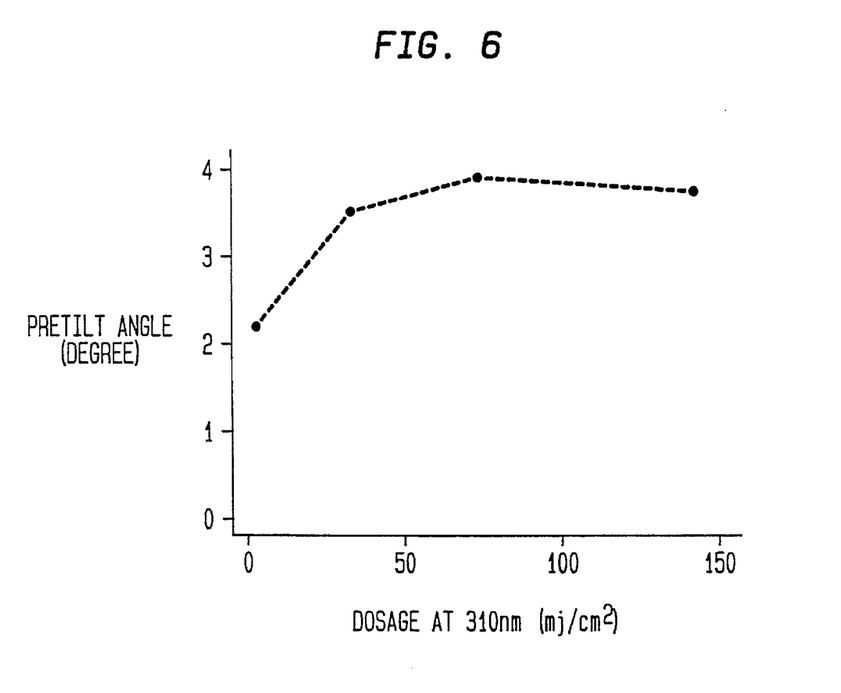
FIG. 6 is a graph of the experimental data resulting from the UV exposure of an I-type alignment material.

Two types of alignment materials have been discovered relative to the present invention. One type is labeled D for Decrease in that its ability to induce the pre-tilt angle in the liquid crystal molecules is decreased after the D-type material has been exposed to an energy beam, such as UV light. FIG. 5 shows the experimental results of the pre-tilt angle of a D-type photosensitive polyimide, which is SE 7210 manufactured by Nissan Chemical industries, Ltd., after dosages ranging from 0 to about 300 mj/cm$^2$ at a wavelength of 260 nm. Additional D-type materials besides RN-1006 (FIG. 3.) and SE 7210 (FIGS. 4 and 5) are SE 713 and RN 626, also manufactured by Nissan Chemical Industries, Ltd, and the Ultradel® 9000 series of photosensitive polyimides, such as Ultradel® 9000D, manufactured by Amoco Chemical Company. The other type of materials is labeled I for Increase in that its ability to induce the pre-tilt angle in the liquid crystal molecules is increased after the I-type material has been exposed to UV light. FIG. 6 shows the experimental result of the pre-tilt angle of an I-type photosensitive polyimide, specifically Probimide 412® manufactured by Ciba-Geigy, after dosages ranging from 0 to 150 mj/cm$^2$ at a wavelength of 310 nm. Additional I-type materials are Ultradel® 7000 series, such as Ultradel® 7501 manufactured by Amoco Chemical Company. Although it is believed that the alignment material either becomes at least partially depolymerized or at least partially crosslinked when it is exposed to an energy beam, such as ultra violet light, this does not necessarily help determine whether a material known to do one or the other upon exposure will be a D-type or an I-type. For example, Ultradel® 9000D is known to crosslink when exposed to UV light and yet it is an D-type material. However, it is not necessary to understand the mechanism that occurs in the alignment material to practice the present invention since a method for determining the pre-tilt angle in both exposed and unexposed alignment materials will be described and was used to generate the pre-tilt data for the two materials in FIGS. 5 and 6. In general, useful alignment materials to practice the present invention are those that become modified to some degree when exposed to an energy beam and would be those polymers, copolymers and/or blends, such as polyimides, polyimide precursors, and polyamate esters or acids or amine salts, whose main chains and/or side chains are at least partially cleaved and the polymer is at least partially converted to oligomers or a lower molecular weight material. Additional useful aligmnent materials would be those polymers, such as polyimide precursors, polyamate esters or acids or amine salts containing crosslinked groups, and whose crosslinking groups at least partially crosslink upon exposure to radiation of appropriate energy. Such crosslinking groups are acrylates, methacrylates, epoxies, and siloxanes. Preferably, the alignment material is sensitive to the energy beam and will undergo modification when exposed. However, if it is not itself sensitive, sensitizers and/or initiators can be incorporated in the alignment material as is well known to those skilled in radiation chemistry. Such sensitizer and initiators are described in the various papers in the book entitled Photochemistry and Photophysics in Polymers published in 1984 by Elsevier Applied Science Publishers and in a paper entitled photoinitiators, An Overview (FC78-510) published by the Society of Manufacturing Engineers. This book and paper are herein incorporated by reference. Those skilled in the liquid crystal display art will recognize that different combinations of alignment materials can be used in fabricating the liquid crystal display of the present invention as long as the magnitude of the pre-tilt inducing ability, after exposure, differs by more than 1.5 degrees. For example, an I-type material can replace the D-type material of FIGS. 3 and 4 but, with the same liquid crystal, Area I would be exposed and Area II would not be exposed. Of course in FIG. 4, the pre-tilt angle, $a_1$, in Area I, after exposure, would have to greater than the pre-tilt angle, $a_3$, which would have to be greater than the pre-tilt angle, $a_2$ in Area II.

In order to establish whether the present invention can be practiced with a particular alignment material, a method will be described for determining the pre-tilt inducing ability of an alignment material before and after exposure. The selected material is coated on a number of pairs, such as four pairs, of transparent substrates, each with a conductive layer such as ITO, in the same manner as would be practiced in fabricating a LC display panel. The alignment layers of one of the four pairs is not exposed while each of the other pairs of alignment layers are exposed to different dosages of UV light at a common wavelength using a Ultra Violet Illumination System, Model 87371 with a 500 watt UV lamp, manufactured by Oriel Corporation. After the exposures, all of the eight alignment layers of the four pairs are aligned by the preferred method of rubbing in the convention direction for nematic liquid crystals without any chiral additives or in direction opposite to that shown in FIG. 8(c). Next, four panels are fabricated with the four pairs of alignment layers, with one of the two alignment layers in contact with one side of the liquid crystal and the other alignment layer in contact with the other side. Each of these four panels are measured as described in a paper entitled Accurate Optical Measurement of Small Tilt Angles in Thin Twisted Nematic Layers by H. Birecki and F. J. Kahn on pages 115 to 123 in the book The Physics and Chemistry of Liquid Crystal Devices. This paper is hereby incorporated by reference. FIG. 1 on page 118 of that paper describes the measurement apparatus and shows the rotary stage on which the sample, such as one of the four panels, is mounted and measured. As shown in FIG. 2, the recorder plots the transmission as a function of incident angle in degrees. Although FIG. 2 shows two curves at different wavelengths, the symmetry offset angle $\Psi$ can be determined from a single curve because the symmetry offset angle $\Psi$ is independent of wavelength. A second different wavelength only confirms the symmetry oilset angle $\Psi$ of the first wavelength. (In FIG. 2, the symmetry offset angle $\Psi$ is about $-35$ degrees for both curves.) By using Equation on page 117 of this reference, the pre-tilt angle $\alpha_0$ can be calculated by inserting the value of $\Psi$ into the equation and setting the twist angle $\beta_0$ to 0 because a liquid crystal without a chiral additive was used. Thus, the pre-tilt angle can be computed for each of the four panels and a curve similar to either FIGS. 5 or 6 can be generated depending on whether the alignment material is D-type or I-type.

Accordingly, with this relatively simple procedure, it can be determined whether an alignment material will have the appropriate differential pre-tilt angles in the exposed and unexposed areas and the conditions necessary to achieve the required pre-tilt angle in the exposed area in manufacturing the liquid crystal panel. It also permits identifying different alignment materials as either D-type or I-type.

Figure 7B:
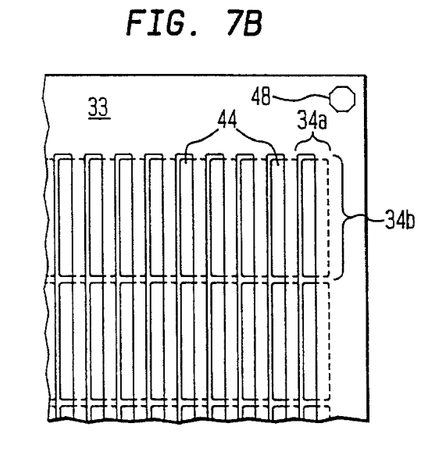
Figure 7C:
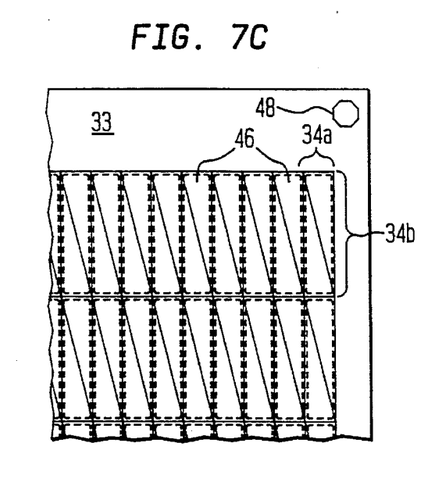

To illustrate a masking technique of the present invention for exposing part of the alignment layer in a pixel or cell with an energy beam, herein UV light, FIGS. 7(a) and (a'), FIGS. 7(b) and (b'), and FIGS. 7(c) and (c') show a partial plan view of three pairs of quartz substrates with six different enlarged transmission patterns formed in the chrome layers 33. The view is from the quartz side with the patterned chrome layer 33 in contact with the alignment layer to be exposed. All of FIGS. 7 show the pixels outlines in solid and dashed lines, with one dimension labelled at 34a and the other 34b. For exposing alignment layer 22, either the mask of FIGS. 7(a), or 7(b), or 7(c) is used whereas the corresponding mask of either FIGS. 7(a'), or 7(b'), or 7(c') is used for exposure of alignment layer 21. To illustrate the relationship of the two exposed patterns in the alignment layers when alignment layers are mounted in the display panel, FIG. 7(a) shows the UV transmission pattern 40 of the mask for exposing the upper portion of one alignment layer laterally while FIG. 7(a') shows the pattern for exposing the lower portion 41 of the other alignment layer so that, when the two alignment layers are positioned face-to-face in the display panel, exposed portions 41 of FIG. 7(a) is facing unexposed portion 42 of FIG 7(a') and exposed portion 40 of FIG. 7(a') is facing unexposed portion 43 of FIG. 7(a). Herein, FIGS. 7(a) and 7(a') is the mask pattern to achieve the pre-tilt angles of the molecules portrayed in FIG. 3. The rear alignment layer 21 associated with the TFT electrode is exposed using the mask of FIG. 7(a') whereas the front alignment layer 22 associated with the common electrode is exposed using the mask of FIG. 7(a). Only the mask pattern of FIG. 7(a) is used to expose the alignment layer 22 for the embodiment of FIG. 4. If it is desired to split the alignment layer longitudinal in half, FIGS. 7(b) and 7(b') show the pattern of the chrome layer 33 in two quartz masks for such longitudinal exposure of the two alignment layers. The mask of FIG. 7(b) with UV transmission pattern 44 and the mask of FIG. 7(b') with transmission pattern 45 are used to expose alignment layers 22 and 21, respectively. For a diagonal exposure, the masks of FIGS. 7(c) and 7(c') with transmission patterns 46 and 47 are used to expose alignment layers 22 and 21, respectively. The octagon hole 48, which is shown in an upper corner of each of the masks, is for accurately positioning the mask over the alignment layers so that, when mounted face-to-face in the display panel, the pixels represented therein will correspond with the pixels represented in the other layers of the display.

All of the masks shown in FIGS. 7 can be used with twisted nematic liquid crystals of the left-handed type, liquid crystals without chiral additives, and guest-host liquid crystals, but only the masks of FIGS. 7(a) and 7(a') can be used with twisted nematic liquid crystals of the right-handed type. The masks of FIGS. 7(b) and (b') and FIGS. 7(c) and (c') would have to be modified as is within the understanding of those skilled in the art based on the teaching of the present invention. In addition, although the mask patterns shown in FIGS. 7 either create a lateral, longitudinal, or diagonal boundary between two areas, exposed and unexposed, it will be recognized by those skilled in the art that the boundary between these areas can be at any angle and that more than two areas can be created, if desired, and more than one boundary can be present. Also, the size and shape of the exposed area as described herein is not critical to the present invention. Different sizes and shapes are within the scope of the invention. For example, if it is desired to have optimum viewing angle to be other than the center point of the display, the size of the exposed area will not be equal to the size of the unexposed area.

Figure 8B:
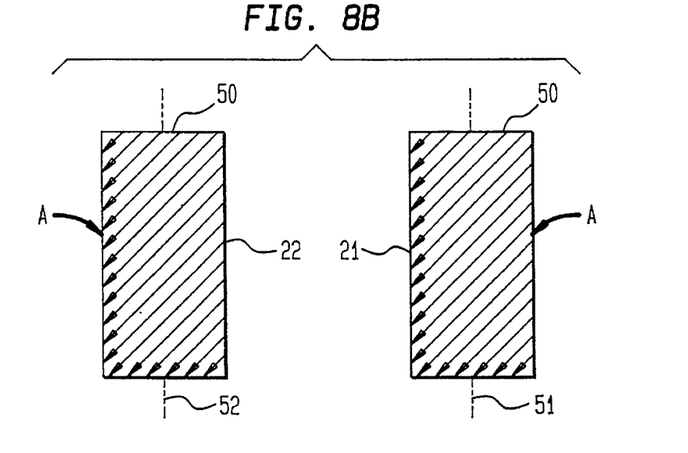
Figure 8C:
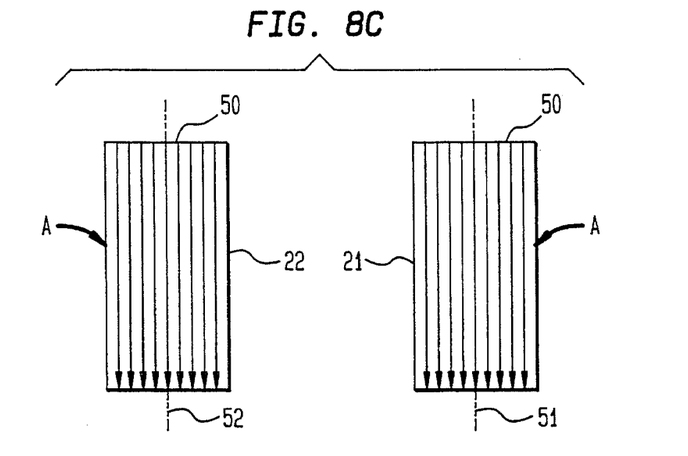

Since different types of liquid crystal compounds can be used in the present invention, the alignment direction of the alignment layers will vary depending on the particular type of liquid crystal used. FIG. 8 is a plan view of the alignment layer facing upwardly and illustrates the alignment direction, which is shown by the arrows in a pixel A of an alignment layer before the layer is mounted in the display panel. Pixel A as represented in the alignment layer is shown with an upper end 50 which will be the upper end when the alignment layer is mounted in the display in its conventional orientation as shown in FIG. 1. FIG. 8(a) shows the alignment direction for alignment layers 21 and 22 when the liquid crystal is a twisted nematic liquid crystal of the left-handed type. A twisted nematic liquid crystal of the right-handed type requires the alignment direction shown in FIG. 8(b) for alignment layers 21 and 22. FIG. 8(c) shows the alignment direction for alignment layers 21 an 22 when either a liquid crystal without a chiral additive, or when a guest-host liquid crystal is used, When alignment layers 21 and 22, as represented by the pixel A in FIG. 8, are mounted in the display as shown in FIG. 1, layers 21 are rotated 90° clockwise around axis 51 and layers 22 are rotated 90° counterclockwise around axis 52 so as to be a mirror image of each other in the panel.

Although the present invention has been primarily described relative to twisted nematic liquid crystals with a left-handed twist, it will be recognized by those skilled in the art that liquid crystals with a right-handed twist also can be used and the twist angle of the cell for either left-handed or right-handed LCs can be anywhere between 0° and 360° even though a twist, angle of between 70° and 90° is preferred. In addition, other types of nematic liquid crystals, such as the classical nematic LCs and dyed nematic LCs, and certain of the smectic LCs, such as the smectic A and smectic C LCs, should be suitable for use with the present invention. Further, it will be understood by one skilled in the art that the polarizers 19 and 20 may be orientated so that the transmission axis of one polarizer is either parallel or perpendicular to that of the other polarizer and the pixels may be normally white or normally black or operate in e-mode or o-mode. If desired, a compensating film may be used to reduce light leakage for light traveling through the liquid crystal display panel in a direction at other than perpendicular to the panel.

Figure 9:
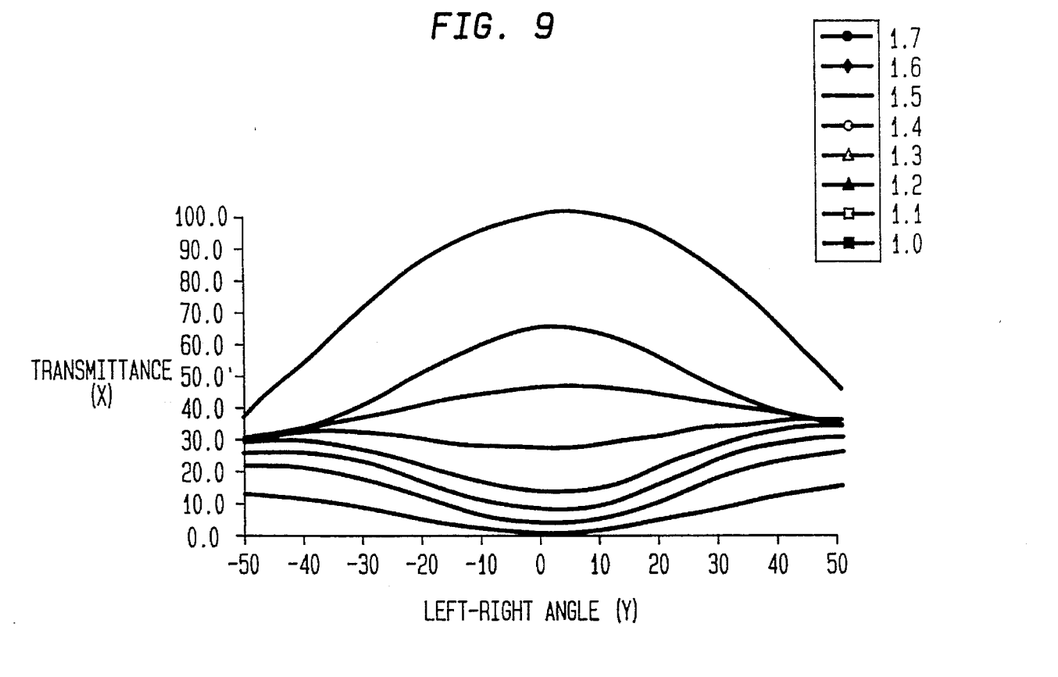
FIG. 9 is a graph of the eight gray level transmissions as a function of viewing angle in the vertical-axis viewing direction for a liquid crystal display utilizing the present invention.
Figure 10:
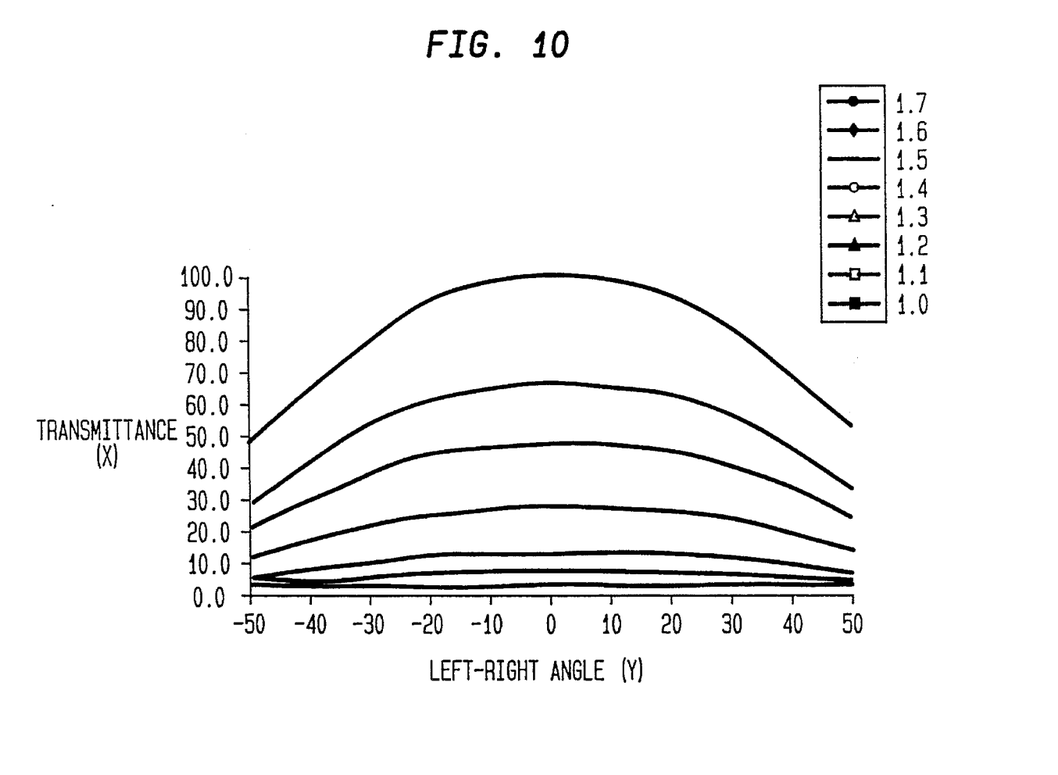
FIG. 10 is a graph of the eight gray level transmissions as a function of the viewing angle in the horizontal-axis viewing direction for a liquid crystal display utilizing the present invention.
Figure 11:
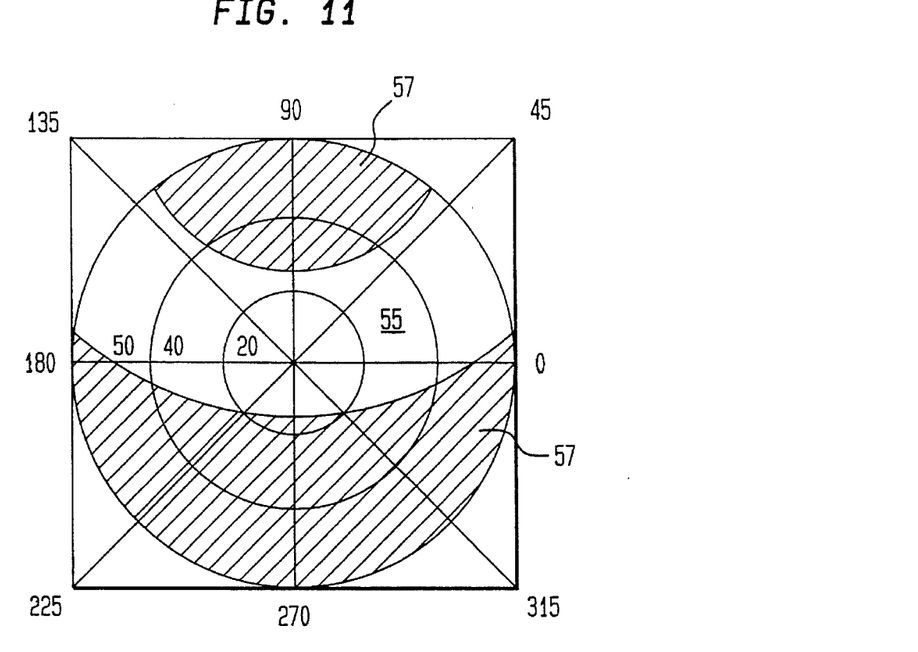
FIG. 11 is a graph of the viewing angle behavior of a single-domain liquid crystal display.
Figure 12:
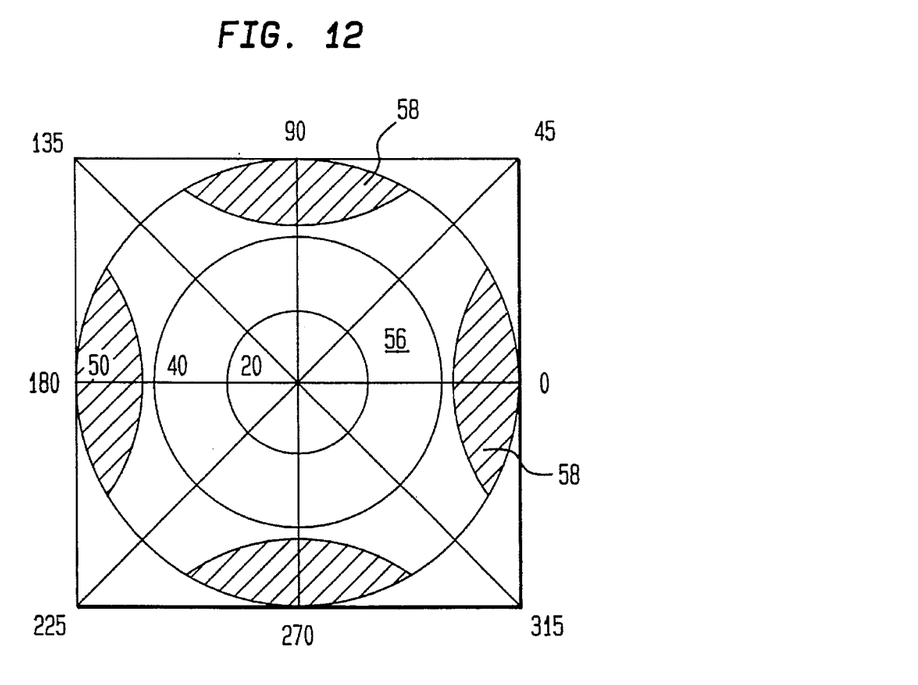
FIG. 12 is a graph of the viewing angle behavior of a two-domain liquid crystal display utilizing the present invention.

To demonstrate the optical performance of the present invention, FIG. 9 shows a plot of eight gray level transmissions as a function of viewing angle in the vertical-axis viewing direction for a 10.4" liquid crystal color display panel fabricated in accordance with the first embodiment. This plot establishes that this panel has quality vertical-axis viewing angles covering from +40° to −40°, in which reverse contrast does not occur. This is about a factor of two times improvement over conventional single-domain liquid crystal display panels whose quality vertical-axis viewing angles only cover from about +30° to about −10°. Further, FIG. 10, is a plot of the horizontal-axis viewing behavior of the panel fabricated in accordance with the first embodiment. The 10.4" panel fabricated in accordance with the present invention was superior at all other angles of viewing between the horizontal-axis and the vertical-axis as shown by the comparison off FIG. 11 (single domain) and FIG. 12 (two-domain). The good quality viewing angles for the single domain display panel of FIG. 11 ranged from about 30° up to 10° down, and from about 50° left to about 50° right as shown by the clear areas 55, whereas the good quality viewing angles of the two-domain display panel of the present invention of FIG. 12 ranged from about 40° up to about 40° down, and about 50° left to about 50° right as shown by the clear areas 56. The cross-hatched areas 57 in FIG. 11 and 58 in FIG. 12 represent inferior quality viewing angles. Clearly, as seen by this comparison, the two-domain display of the present invention is vastly superior to the current single domain display.

Although the invention has been particularly shown and described with reference to the preferred embodiments thereof, it will be understood by those skilled in the art that changes in form and detail may be made without departing from the spirit and scope of the invention. For example, the arrangement of the alignment layers and the exposed areas on the front and rear electrodes as described in the embodiments can be reversed with the appropriate modifications in alignment direction and other aspects, such as the type of liquid crystal used as will be understood by those skilled in the art. In addition, other methods of creating multiple domains as described in the Background Art can be combined with the method of the present invention. If desired, either one of the fringe field methods of the Background Art could be combined with either embodiment FIG. 3 or FIG. 4 of the present invention, as could the multiple rubbing and multiple alignment methods.

What is claimed is:

1. A multi-domain liquid crystal display having an array of pixels comprising:

two alignment layers disposed on transparent electrodes and each having an ability of inducing a predetermined pre-tilt angle on liquid crystal molecules, at least one of said alignment layers having been selectively altered so that said alignment layer comprises at least one altered area said altered area having an ability to induce a predetermined pre-tilt angle on the liquid crystal molecules which differs in magnitude of pre-tilt angle from the ability of the unaltered areas to induce said predetermined pre-tilt angle on said molecules, said one alignment layer having only one alignment direction and comprising the same bulk material for inducing the pre-tilt angles in both the altered and unaltered areas of said layer;

a liquid crystal layer of liquid crystal molecules disposed between said alignment layers;

a polarized light source for irradiating the liquid crystal molecules; and means for applying voltage across the transparent electrodes in the altered and unaltered areas of said one alignment layer whereby more than one domain is formed.

2. The liquid crystal display of claim 1 wherein said magnitude the pre-tilt angle is decreased in the altered area of the alignment layer.

3. The liquid crystal display of claim 1 wherein said magnitude of the pre-tilt angle is increased in the altered area of the alignment layer.

4. The liquid crystal display of claim 1 wherein said altered area in at least one of the alignment layers was created by selectively exposing said alignment layer to a beam of sufficient energy to modify the magnitude of the pre-tilt angle induced by said layer.

5. The liquid crystal display of claim 4 wherein said magnitude of the pre-tilt angle is decreased in the exposed area of the alignment layer.

6. The liquid crystal display of claim 4 wherein said magnitude of the pre-tilt angle is increased in the exposed area of the alignment layer.

7. The liquid crystal display of claim 1 wherein said one alignment layer is selectively altered by exposure to ultra violet radiation.

8. The liquid crystal display of claim 7 wherein said one alignment layer is a photosensitive polyimide.

9. The liquid crystal display of claim 1 wherein said one alignment layer is formed with altered and unaltered areas in each of said pixels.

10. The liquid crystal display of claim 9 wherein the boundary between said altered and unaltered layers is one of lateral, longitudinal, and diagonal across the pixel.

11. In a liquid crystal display having an array of pixels, each cell or pixel having a liquid crystal layer disposed between and with a first surface in contact with a first alignment layer having an ability to induce a predetermined pre-tilt angle on liquid crystal molecules and carried on a transparent electrode and a second surface in contact with a second alignment layer also having an ability to induce a predetermined pre-tilt angle on liquid crystal molecules and carried on a transparent electrode, the improvement comprising:

at least part of the first alignment layer having been modified by exposure to an energy beam sufficient to change the pre-tilt inducing ability of said layer so that its ability to induce a predetermined pre-tilt angle in the exposed area differs in the magnitude of the angle from said predetermined pre-tilt angle in the unexposed area, thereby creating more than one domain in the liquid crystal display when voltage is applied to said electrodes.

12. The liquid crystal display of claim 11 wherein said magnitude of the pre-tilt angle is decreased in the exposed area of the alignment layer.

13. The liquid crystal display of claim 11 wherein said pre-tilt angle is increased in the exposed area of the alignment layer.

14. The liquid crystal display of claim 11 wherein said beam for selectively exposing said alignment layer is ultra violet light and a material of said alignment layer is sensitive to the wavelengths emitted by said ultra violet light.

15. The liquid crystal display of claim 11 wherein said second alignment layer has an area that is unexposed to said energy beam and wherein said exposed area in the first alignment layer faces the unexposed area in the second alignment layer.

16. The liquid crystal display of claim 11 wherein said second alignment layer is a material with an ability to induce a different predetermined pre-tilt angle in the liquid crystal molecules from the material in said first alignment layer, the magnitude of said different pre-tilt angle being between the magnitudes of said pre-tilt angles of the exposed and unexposed areas of said first alignment layer.

17. The liquid crystal display of claim 11 wherein liquid crystal molecules are twisted nematic with a left-handed twist and said first alignment layer is on the front side of the display panel in its conventional orientation and with the exposed portion at the lower half of the pixel and with its pre-tilt angle inducing ability decreased, and said second alignment layer being on the rear side of the panel, said magnitudes of said predetermined pre-tilt angles being in decreasing order of unexposed first layer, second layer, and exposed first layer.

18. The combination of a computer for processing data and a monitor for receiving and visually presenting the data from said computer, said monitor comprising a liquid crystal display panel including an array of pixels having a liquid crystal layer of liquid crystal molecules disposed between two alignment layers, each having an ability of inducing a predetermined pre-tilt angle on the liquid crystal molecules adjacent said layers, with at least one of said alignment layers with only one alignment direction and having been selectively altered so that said alignment layer comprises at least one altered area whose ability to induce a predetermined pre-tilt angle on the liquid crystal molecules differs in magnitude from the ability of the unaltered areas to induce said predetermined pre-tilt angle on the molecules, the bulk material of said one alignment layer for inducing the pre-tilt angles being the same in both the altered and unaltered areas, thereby creating more than on domain when voltage is applied across the liquid crystal layer and whereby the viewing angle behavior of said monitor is of good quality from essentially all angles of viewing and, when said computer data is visually presented on the monitor, it is able to be seen from many different angles relative to the face of the monitor.

19. The combination of claim 18 wherein said magnitude of the pre-tilt angle is decreased in the altered area of the alignment layer.

20. The combination of claim 18 wherein said magnitude of the pre-tilt angle is increased in the altered area of the alignment layer.

21. The combination of claim 18 wherein both of said alignment layers contain altered areas and, when said alignment layers are mounted face-to-face in the display panel, the altered areas of one alignment layer faces the unaltered areas of the other alignment layer.

22. The combination of claim 18 wherein said alignment layers in face-to-face relationship in the display are formed of materials having predetermined pre-tilt angles of different magnitudes and only one of the alignment layers is selectively altered so that said one alignment layer comprises at least one altered area with a predetermined pre-tilt angle of a different magnitude from the predetermined pre-tilt angle of the unaltered area and the predetermined pre-tilt angle of said other alignment layer.

23. A television for receiving communicated signals and having a display for visually presenting the information contained in said signals, said display comprising a liquid crystal display panel including an array of pixels or cells having a liquid crystal layer of liquid crystal molecules disposed between two alignment layers, each having an ability of inducing a predetermined pre-tilt angle on the liquid crystal molecules adjacent said layers, at least one of said alignment layers having been selectively altered so that said alignment layer comprises at least one altered area whose ability to induce a predetermined pre-tilt angle on the liquid crystal molecules differs in magnitude from the ability of the unaltered areas to induce said predetermined pre-tilt angle on the molecules, said one alignment layer having only one alignment direction and comprising the same bulk material for inducing the pre-tilt angles in the altered and unaltered areas, thereby creating more than one domain when voltage is applied across the liquid crystal layer and whereby the viewing angle behavior of said display is of good quality from essentially all angles of viewing and, when said signals received by said television and information contained therein is visually presented on the display, it is able to be seen from many different angles relative to the face of the display.

24. The television of claim 23 wherein said magnitude of the pre-tilt angle is decreased in the altered area of the alignment layer.

25. The television of claim 23 wherein said magnitude of the pre-tilt angle is increased in the altered area of the alignment layer.

26. The television of claim 23 wherein both of said alignment layers contain altered areas and, when said alignment layers are positioned face-to-face in the display panel, the altered area of one alignment layer facing the unaltered areas of the other alignment layer.

27. The television of claim 23 wherein said alignment layers in face-to-face relationship in the display are formed of materials having predetermined pre-tilt angles of different magnitudes and only one of the alignment layers is selectively altered so that said one alignment layer comprises at least one altered area with a predetermined pre-tilt angle of a different magnitude from the predetermined pre-tilt angle of the unaltered area and the predetermined pre-tilt angle of said other alignment layer.

28. In a method of fabricating a multi-domain liquid crystal display having an array of pixels, said display including a liquid crystal layer with liquid crystal molecules and a pair of transparent electrodes with an alignment layer disposed on each of said electrodes so as to be in contact with opposite sides of said liquid crystal layer when positioned in the display, said alignment layers inducing a predetermined pre-tilt angle in the molecules adjacent the layers, the improvement comprising the steps of:

selectively altering at least one alignment layer so that said predetermined pre-tilt angle is altered in magnitude; said bulk material of the alignment layer for inducing the pre-tilt angles being the same in both the altered and unaltered areas, and uniformly arranging said one alignment layer with only one alignment direction.

29. The method of claim 28 wherein said selective alteration is caused by a beam of sufficient energy to cause the pre-tilt angle inducing ability to be altered in the exposed area.

30. The method of claim 28 wherein said energy beam is ultra violet light of a wavelength to which the material of said one alignment layer is sensitive.

* * * * *